(12) United States Patent
Cherukuri

(10) Patent No.: US 6,594,856 B1
(45) Date of Patent: Jul. 22, 2003

(54) PIVOTAL ROLLER MECHANISM

(76) Inventor: Hema Cherukuri, 9212 E. Arbor Cir. #1, Englewood, CO (US) 80111

(*) Notice: Subject to any disclaimer, the term of this patent is extended or adjusted under 35 U.S.C. 154(b) by 0 days.

(21) Appl. No.: 09/683,974

(22) Filed: Mar. 7, 2002

(51) Int. Cl.[7] .......................... B60B 33/06; A47B 91/06
(52) U.S. Cl. .................. 16/34; 16/44; 16/32; 16/33
(58) Field of Search ..................... 16/32, 33, 34, 16/19, 44; 280/86.1, 43.24; 190/18 A; 301/111, 125, 126, 131–133, 119

(56) References Cited

U.S. PATENT DOCUMENTS

| | | | |
|---|---|---|---|
| 2,059,420 A | 11/1936 | Ward, Jr. | |
| 2,596,655 A | * 5/1952 | Converse | ............ 16/44 |
| 2,688,149 A | 9/1954 | Popp | |
| 2,707,795 A | 5/1955 | Skupas | |
| 2,718,657 A | * 9/1955 | Bastian | ............ 16/34 |
| 3,349,425 A | 10/1967 | Rabelos | |
| 3,350,095 A | 10/1967 | Clasen | |
| 3,721,315 A | 3/1973 | Wehner | |
| 3,758,918 A | * 9/1973 | Bruun | ............ 16/44 |
| 4,397,062 A | * 8/1983 | Huang | ............ 16/33 |
| 4,559,669 A | 12/1985 | Bonzer et al. | |
| 4,763,910 A | 8/1988 | Brandli et al. | |
| 4,773,123 A | * 9/1988 | Yu | ............ 16/34 |
| 4,783,879 A | 11/1988 | Weaver | |
| 5,001,808 A | 3/1991 | Chung | |
| 5,347,680 A | 9/1994 | Rippe | |
| 5,350,151 A | 9/1994 | Aoki | |
| 5,366,231 A | * 11/1994 | Hung | ............ 16/44 |
| 5,584,546 A | * 12/1996 | Gurin et al. | ............ 16/19 |
| 5,778,488 A | * 7/1998 | Tsai | ............ 16/34 |
| 5,873,145 A | * 2/1999 | Chou | ............ 16/44 |
| 6,089,666 A | 7/2000 | Rosko | |

FOREIGN PATENT DOCUMENTS

JP 7-228103 * 8/1995

* cited by examiner

Primary Examiner—Chuck Y. Mah
(74) Attorney, Agent, or Firm—Roger A. Jackson

(57) ABSTRACT

A fixed pivotal retractable roller mechanism 20 and method for statically supporting an item 46 upon a support surface 44 in an inoperative state and supporting the item 46 to roll along the support surface 44 in an operative state. The mechanism 20 includes a housing 22, a swingarm 26 pivotally engaged with the housing 22, a spring 36, and a roller 32. The swingarm 26 has pivotal movement relative to the housing 22, the swingarm 26 has an inoperative position state where the roller 32 is retracted allowing the housing 22 to rest on and statically contact the support surface 44 and an operative position state where the swingarm 26 is extended such that the housing 22 is not in contact with the support surface 44 allowing the item 46 to roll along the support surface 44. Other embodiments with castor and without a spring are also disclosed.

30 Claims, 5 Drawing Sheets

PIVOTAL ROLLER MECHANISM

TECHNICAL FIELD

The present invention generally relates to mechanisms that act to support an item while at the same time allowing the item to move across a support surface. In particular, the present invention relates to using a retractable roller mechanism that provides a static support upon the support surface when the item, such as an article of furniture has a relatively high force towards the support surface causing the roller mechanism to retract and when the item has a relatively lower force towards the support surface the roller mechanism automatically separates the static support from the support surface thereby allowing a roller to freely move the item along the support surface.

BACKGROUND OF INVENTION

There has long been a desire to move large, bulky, and unwieldy items easily across a support surface with a minimum of effort while at the same time having the item not be unstable along the support surface during the times when it is desired that the item not to be easily moved across the support surface. This desire to have a roller mechanism or castor mechanism have two position states, being a first or operative position state where the roller serves to allow the item to be easily moved along the support surface and a second or inoperative position state wherein the roller becomes inoperative not allowing the item to be easily moved along the support surface, is well recognized in the prior art.

Previous approaches to this problem have often resulted in complex castor mechanisms that required the item to be lifted in order to actuate the castor into the previously mentioned first or operative position state from the second or inoperative position state or vice versa. The problem with this approach was that it required the item to be lifted, which is unsatisfactory because the desire to avoid lifting the item is the reason for providing roller mechanisms in the first place. Even if a particular item is not all that heavy, the size and bulk of the item usually makes it difficult for a single individual to simultaneously lift the item and operate the roller mechanism to go from the inoperative state to the operative state. In addition most items have multiple roller mechanisms, which require a single individual to lift the item multiple times at different locations. The aforementioned complex caster mechanisms have sometimes included jacks, in which the item can be raised and lowered to effectuate the roller mechanism changing its operating state, however, these mechanisms are still difficult to use for two reasons. First, if the item is located in a confined area or space, the jacking mechanism is difficult to access, and secondly, the location of the jacking mechanism, typically being on the bottom of the item could be difficult for an individual to be able to reach to the jacking mechanism while simultaneously attempting to lift the item. Other approaches to this problem have included using a spherical roller mechanism that fits inside:a mating socket, wherein the socket is retractable into a separate housing to provide both static support on the support surface when the spherical roller and socket assembly are retracted into the housing and when the spherical roller and socket assembly are extended from the housing allowing the item to be moved along the support surface. The problem with the spherical roller is that it operated at a close clearance with the socket assembly and is prone to ingesting foreign material into this close clearance, such as carpet fibers, when the spherical roller was moving across the support surface, which caused a high degree of a frictional resistance to the spherical roller rotating. This resistance to rotation by the spherical roller made it difficult to move the item across the support surface. Another problem with the spherical roller was that it had a small contact area with the support surface which increased the unit loading that the spherical roller placed upon the support surface from the weight of the item, this in turn increased the likelihood of damage to the support surface from the spherical roller and again increased resistance to moving the item across the support surface when the support surface softer such as wood, linoleum, and carpet.

Prior art examples would be U.S. Pat. No. 5,347,680 to Rippe, U.S. Pat. No. 5,001,808 to Chung, and U.S. Pat. No. 4,783,879 to Weaver that utilize mechanisms to manually adjust the roller height to accommodate the aforementioned operative state and inoperative state. Wherein the roller in the operative state allows the item to be moved across the support surface and in the inoperative state the roller is retracted to allow the roller assembly to statically rest upon the support surface. These mechanisms require manual activation to change the roller assembly from either the operative state to the inoperative state or vice versa, with the previously mentioned disadvantages of manual activation being located at the roller assembly adjacent to the support surface.

There remains a need by for a retractable roller mechanism that supports an item while providing the two desired position states of being operative to allow the item to move along a support surface and being inoperative to statically support the item upon the support surface, without the need for an individual to lift the item or operate the mechanism while at the same time being adaptable to varying support surface types, minimizing damage to the support surface, and being a simple to construct.

SUMMARY OF INVENTION

It is an object of the present invention to provide an improved fixed pivotal retractable roller mechanism that can be operated conveniently by the normal forces that are applied to the item on which the roller mechanism is mounted, without the requirement of an individual having to access the roller mechanism itself.

It is a further object of the present invention to provide a fixed pivotal retractable roller mechanism wherein the roller is automatically retracted into the housing with the fixed pivotal retractable roller mechanism in an inoperative state by a exerting a force that is greater than the normal weight of the item from the item to the support surface, allowing the item to assume a static or stationary position for the period of time in which the force is continuously applied.

Still another object of the present invention is to provide a fixed pivotal retractable roller mechanism wherein the fixed pivotal retractable roller mechanism is automatically placed into an operative state, and permitting free movement of the item along the support surface when the force from the item to the support surface is equal to the normal weight of the item.

Yet another object of the present invention is to provide a fixed pivotal retractable roller mechanism of simple non-castor construction that allows only bidirectional movement of the item while the fixed pivotal retractable roller mechanism is in the operative state.

Still yet another object of the present invention to provide a pivotal retractable castor roller mechanism with an option for castor capabilities on a roller pivot.

It is still yet another object of the present invention to provide a pivotal retractable castor roller mechanism with an option for castor capabilities on a roller pivot that is non retractable.

It is yet still another object of the present invention to provide a pivotal retractable castor roller mechanism with an option for castor capabilities on a roller pivot that is retractable into an inoperative position state from an operative position state and vice versa.

It is another object of the present invention to provide a retractable roller mechanism that while in an operative position state has a roller that is adaptable to varying support surface types.

It is yet another object of the present invention to provide a retractable roller mechanism that while in an operative state or in inoperative state will result in none or minimal damage to the support surface.

It is further yet another object of the present invention to provide a retractable roller mechanism that is constructed of a minimum number of parts for ease of manufacture and lower unit costs.

The first exemplary embodiment of the present invention is a fixed pivotal retractable roller mechanism that statically supports an item upon a support surface in an inoperative state and supports the item to roll along the support surface in an operative state. Broadly, the first exemplary embodiment of the present invention includes a housing having a symmetrically located axis, a swingarm fixed pivot frame that is pivotally engaged with the housing, with the swingarm fixed pivot frame having pivotal movement that is substantially parallel to the housing axis, also the pivotal movement is relative to the housing. The swingarm fixed pivot frame has an inoperative position state wherein the swingarm fixed pivot frame is retracted such that the housing rests on and statically contacts the support surface and an operative position state wherein the swingarm fixed pivot frame is extended from the inoperative position state toward the support surface. Also included is a spring element that is disposed between the housing and the swingarm fixed pivot frame to bias the swingarm fixed pivot frame toward the operative position state. In addition, a roller element is rotatably mounted in the swingarm fixed pivot frame, the roller element disposed to roll along the support surface when the swingarm fixed pivot frame is in the operative position state. The operative position state results in the housing not being in contact with the support surface, the roller element having a rotational axis perpendicular to and substantially adjacent to the housing axis.

The second exemplary embodiment actually includes a version with a spring element and a version without a spring element that provides a solid support; the following describes the spring element version. The present invention is a pivotal retractable castor roller mechanism that statically supports an item upon a support surface in an inoperative state and supports the item to roll along the support surface in an operative state. Broadly, the present invention includes a housing having a centrally located axis, the housing having a circular base portion and a surrounding cylindrical sidewall extending from the circular base portion towards the support surface to define a housing interior, with the cylindrical sidewall having an exterior portion and an interior portion. Also included is a swingarm castor frame slidably engaged to the interior portion of the sidewall, the swingarm castor frame is positioned to be substantially perpendicular to the sidewall in the operative state. The slidable engagement is operable to move circumferentially around the interior portion of sidewall, the swingarm castor frame also has pivotal movement being substantially parallel to the centrally located axis, the pivotal movement being relative to said housing. The swingarm castor frame having an inoperative position state wherein the swingarm castor frame is retracted such that the housing rests on and statically contacts the support surface and an operative position state wherein the swingarm castor frame is extended from the inoperative position state toward the support surface. In addition, a spring element having a first end and a second end, with the first end being slidably adjacent to the circular base and the second end being attached to the swingarm castor frame. The spring element is positioned to be in-between the centrally located axis and the interior portion, with the spring element being operational to bias the swingarm castor frame toward the operative position state. The spring slidably adjacent first end having a coefficient of friction higher than the swingarm castor frame slidable engagement to provide for the dampening of castor movement. Also, a roller element rotatably mounted in the swingarm castor frame, the roller element is disposed to roll along the support surface when the swingarm castor frame is in the operative position state such that the housing is not in contact with the support surface. The roller element has a rotational axis perpendicular to and substantially adjacent to the centrally located axis.

These and other objects of the present invention will become more readily appreciated and understood from a consideration of the following detailed description of the exemplary embodiments of the present invention when taken together with the accompanying drawings, in which:

REFERENCE NUMBERS IN DRAWINGS

Figure 1:
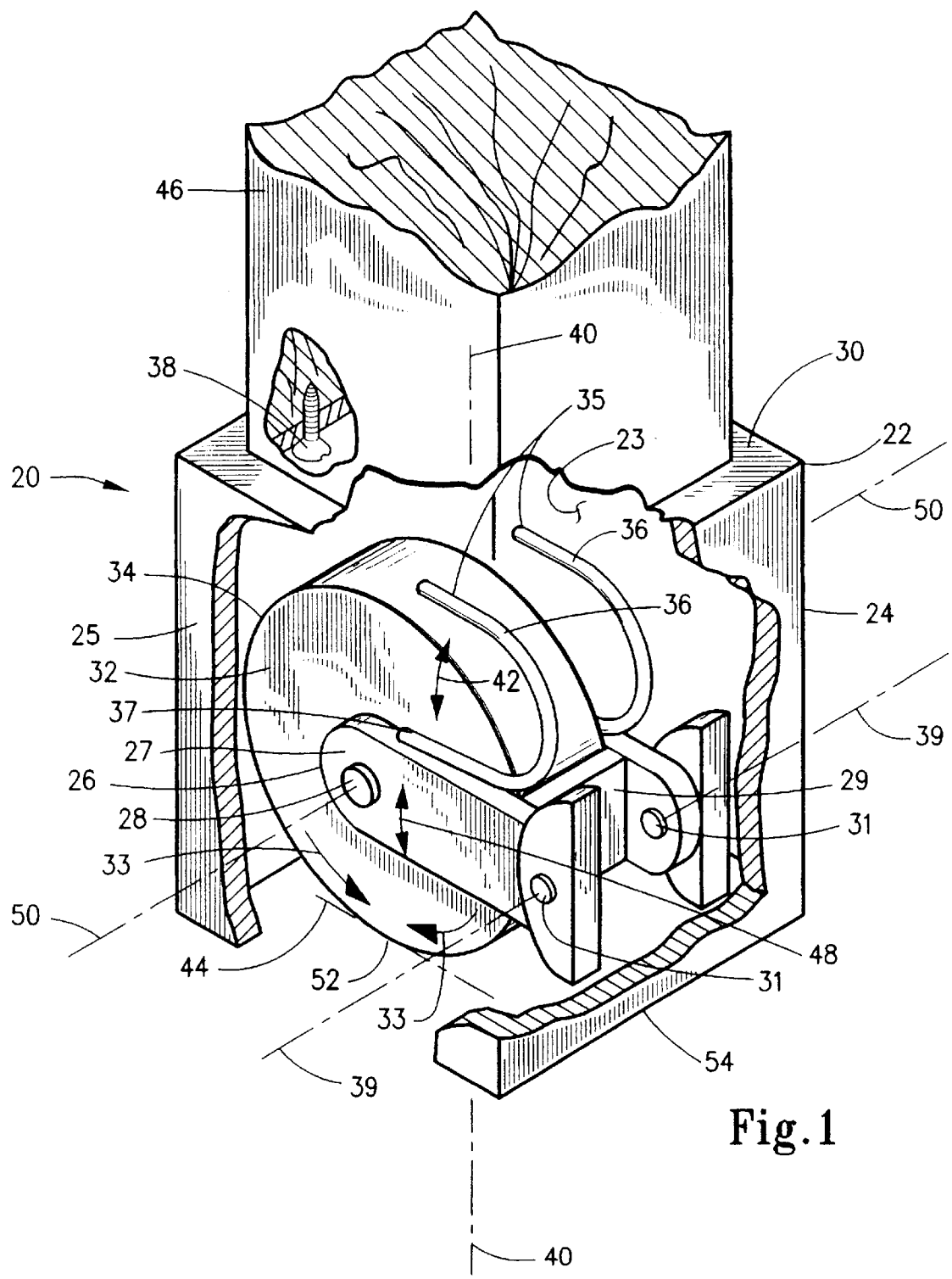
FIG. 1 is a perspective view of the first exemplary embodiment of the pivotal roller mechanism being the fixed pivotal retractable roller mechanism showing the mechanism in an operative state on the support surface, with the mechanism attached to a furniture leg.

20 First exemplary embodiment of the retractable roller mechanism being the fixed pivotal retractable roller mechanism
22 Housing fixed pivot
23 Interior portion of surrounding sidewall
24 Surrounding sidewall of fixed pivot housing
25 Exterior portion of surrounding sidewall
26 Swingarm fixed pivot frame
27 Arm portion of fixed pivot swingarm
28 Axle for roller element
29 Brace portion of fixed pivot swingarm
30 Base of fixed pivot housing
31 Pivot of fixed pivot swingarm
32 Roller element
33 Rotational movement of roller element
34 Outer periphery of roller element
35 Contact attachment for spring element to base
36 Spring element for fixed pivot housing
37 Contact attachment of fixed pivot housing spring element to arm portion of fixed pivot frame swingarm
38 Fastener for roller mechanism to item
39 Pivotal axis
40 Axis for fixed pivot housing
42 Spring constant
44 Surface support
46 Item supported
48 Pivotal movement of fixed pivot swingarm
50 Rotational axis of roller element
52 Roller contact area on support surface
54 Contact area on support surface for fixed pivot housing
55 Contact area for roller outer periphery
56 Second exemplary embodiment of the retractable roller mechanism being the pivotal retractable castor roller mechanism
57 Contact area on support surface for castor housing
58 Housing castor
59 Base of castor housing
60 Surrounding sidewall of castor housing
61 Axis of castor housing
62 Swingarm castor frame
63 Exterior portion of surrounding sidewall for castor
64 Arm portion of castor swingarm
65 Interior portion of surrounding sidewall for castor
66 End portion of castor swingarm
67 Pivotal movement of castor swingarm
68 Aperture in end portion of castor swingarm 6
69 Castor movement of castor swingarm
70 T-slot in internal portion of surrounding cylindrical sidewall of castor housing
71 Edge of T-slot in castor housing
72 Roller pin with a head
74 Support element for castor housing
75 Spring element for castor housing
76 Slidable engagement of spring element for castor housing
77 Roller pinhead in T-slot
78 Contact of castor housing spring element to arm portion of castor swingarm
79 Roller pinhead in end portion of castor frame

DETAILED DESCRIPTION

The present invention includes the first exemplary embodiment that is a fixed pivotal retractable roller mechanism that statically supports an item upon a support surface in an inoperative state and supports the item to roll along the support surface in an operative state. Broadly, the first exemplary embodiment of the present invention includes a housing having a symmetrically located axis, a swingarm fixed pivot frame that is pivotally engaged with the housing, with the swingarm fixed pivot frame having pivotal movement that is substantially parallel to the housing axis, also the pivotal movement is relative to said housing. The swingarm fixed pivot frame has an inoperative position state wherein the swingarm fixed pivot frame is retracted such that the housing rests on and statically contacts the support surface and an operative position state wherein the swingarm fixed pivot frame is extended from the inoperative position state toward the support surface. Also included is a spring element that is disposed between the housing and the swingarm fixed pivot frame to bias the swingarm fixed pivot frame toward the operative position state. In addition, a roller element is rotatably mounted in the swingarm fixed pivot frame, the roller element disposed to roll along the support surface when the swingarm fixed pivot frame is in the operative position state. The operative position state results in the housing not being in contact with the support surface, the roller element having a rotational axis perpendicular to and substantially adjacent to the housing axis.

Figure 2:
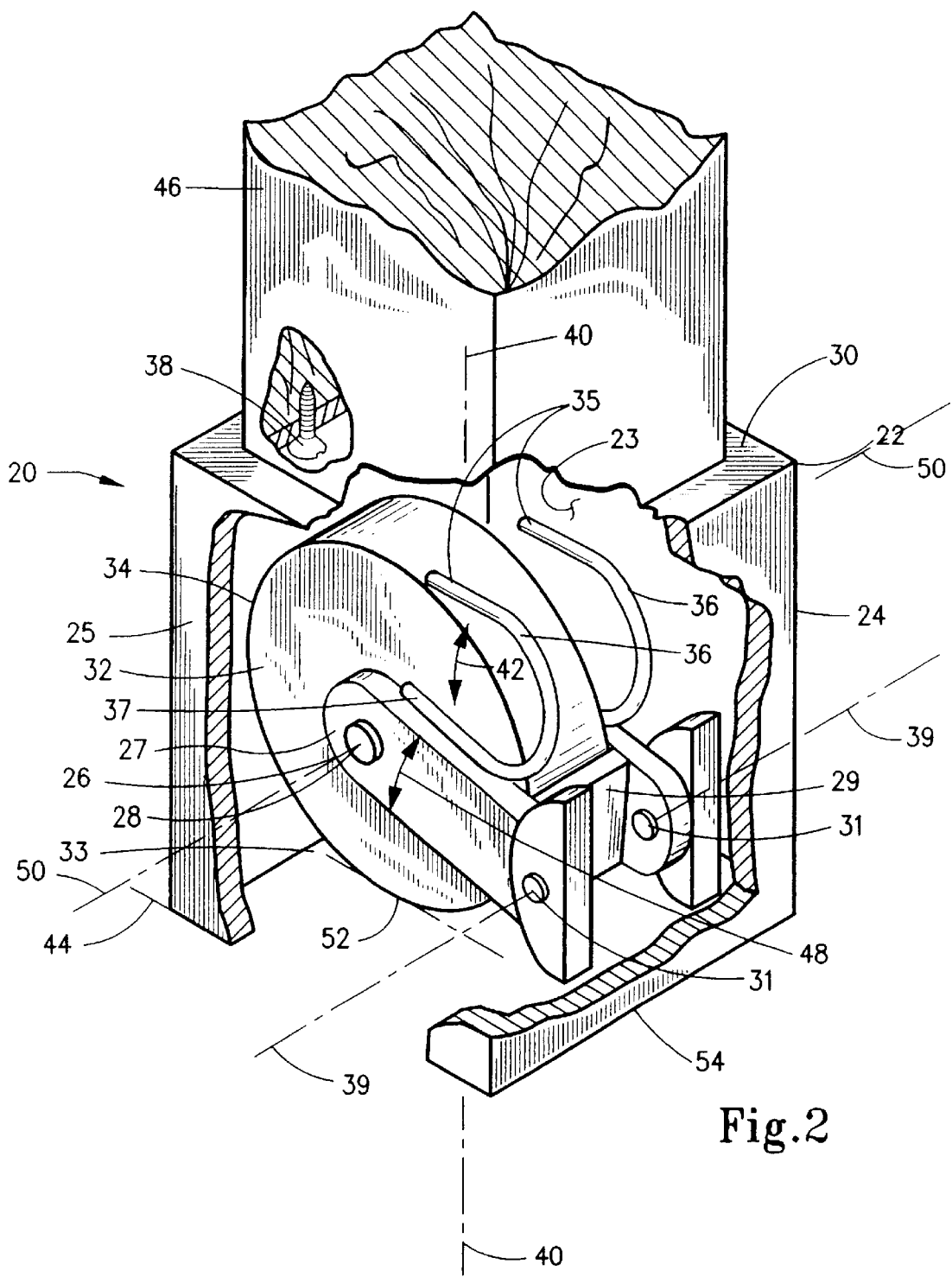
FIG. 2 is a perspective view of the first exemplary embodiment of the pivotal roller mechanism being the fixed pivotal retractable roller mechanism showing the mechanism in an inoperative state with the roller retracted and a housing statically contacting and resting on the support surface, with the mechanism attached to a furniture leg.

With initial reference to FIGS. 1 and 2, a perspective view is shown of the first exemplary embodiment of the present invention that is a fixed pivotal retractable roller mechanism 20 showing the mechanism in an operative state in FIG. 1 and in the inoperative state in FIG. 2, in either case being on the support surface 44, with the mechanism 20 adapted to be attached to an item 46 to be supported such as an article of furniture or furniture leg as shown. The housing 22 includes a base 30, a symmetrical axis 40, a surrounding sidewall 24 that extends from the base 30 towards the support surface 44, the surrounding sidewall 24 then defines a housing 22 interior, which also includes the interior portion 23 of the surrounding sidewall 24 and an exterior portion 25 of the surrounding sidewall 24. The base 30 on the side opposite of the housing interior is adapted to attach to item 46 that is to be supported. Although a fastener 38 is shown to attach the supported item 46 to the base 30 of the housing 22, many other methods of attachment could be used also such as adhesives, interlocking fits, or any other equivalent means of attachment suitable to accommodate the given load conditions. The fastener can be constructed of any suitable steel or plastic adequate for the loading conditions between the item 46 and the fixed pivotal retractable roller mechanism 20. The materials of construction for the housing 22 are preferably an injected plastic type material for high volume and high quality, alternatively a fabricated material such as metal could be used for lower production volumes, any other equivalent material of construction would be acceptable for the required loading and operating conditions. The housing 22 is shown broken away to expose a swingarm fixed pivot frame 26, the roller element 32, the axle 28, the spring elements 36, and the fastener 38. As the mechanism 20 is shown being in the operative state the drawing shows that the housing 22, or more specifically the contact area of the housing 54 is separated from the support surface 44 which in turn allows the mechanism 20 to roll along the support surface 44 while supporting the item 46. The spring elements 36 are disposed between the housing 22 and the frame 26 with the purpose of biasing the frame 26 to the operative position state as shown, thus putting the mechanism 20 into the operative position state. The biasing of the frame 26 acts to extend the frame 26 from the inoperative position state toward the support surface 44. The spring elements 36 have a frame contact attachment 37 on the frame 26 and a base contact attachment 35 on the base 30. The purpose of the spring element 36 frame contact attachment 37 and base contact attachment 35 is to limit the pivotal movement 48 of the frame 26 in the operative position state, thus preventing the roller 32 from excessively extending outside of the housing 22 if the mechanism 20 is lifted a great distance off of the support surface 44. The spring elements 36 can be a singular spring positioned on the frame 26 on one side of the roller 32 or two spring elements 36 can be used with one on each side of the roller 32 as shown.

Looking in detail at the roller 32 it can be seen that the roller 32 is rotatably mounted in the frame 26 with the roller 32 disposed to roll along the support surface 44 when the frame 26 is in the operative position state as shown. This results in the housing 22 or more specifically the surrounding sidewall 24 not being in contact with the support surface allowing the mechanism 20 and the supported item to roll along the support surface 44 with the mechanism 20 being in the operative state. The roller 32 has a rotational axis 50 that is perpendicular to and substantially adjacent to the housing axis 40. The roller 32 also has an outer periphery 34 that comes into contact with the support surface 44, where a contact area 52 is formed against the support surface 44. This contact area 52 would support the weight of the mechanism 20 and the item supported 46, being the situation where the spring 36 extends against the swing arm fixed pivot frame 26 to extend the frame 26, indicated by motion arrows 48, resulting in the operative position state for the frame 26. Preferably, frame 26 can be constructed of a pivoted bifurcated bracket that straddles the roller 32; the bifurcated bracket preferably includes a brace portion 29 that terminates into to bifurcated arm portions 27 that straddle the roller 32. The roller 32 could also be constructed as a wheel that rotates about the axle 28 as shown by the directional arrows 33 corresponding to the mechanism 20 moving along the support surface 44 in the operative state. The roller 32 can be constructed of a hard or soft material such as rubber, steel, or plastic, however, on an alternative basis the outer periphery 34 of the roller could be constructed of a deformable material to be able to control the area of the contact 52 that the outer periphery, 34 of the roller 32 makes against the support surface 44 while the mechanism 20 is in the operative state. Returning to the frame 26 and moving from the brace portion 29, two arm portions 27 extend to be pivotally engaged with the housing 22 pivoting on a pivotal axis 39, at pivot point 31, wherein the frame 26 moves in motion depicted by arrows 58 being substantially parallel to the housing axis 40 relative to the housing 22. More particularly, the pivotal engagement of the frame 26 is with the interior portion 23 of the surrounding sidewall 24 of the housing 22 as shown. The frame 26 having pivotal movement 48 that is substantially parallel to the housing axis 40 with the pivotal movement 48 being relative to the housing 22. The frame 26 that includes the brace portion 29 and two bifurcated arm portions 27 are disposed within the housing 22 interior both in the operative state and in the inoperative state. The arm portions 27 on a side opposite of the axle 28 terminate in the pivotal 31 engagement or attachment around the pivotal axis 39 to the interior portion 23 of the surrounding sidewall 24 of the housing 22. The pivotal axis 39 is parallel to the rotational axis 50. The materials of construction of the frame 26 and axle 28 are preferably an injected plastic type material for high volume and high quality, alternatively a fabricated material such as metal could be used for lower production volumes, any other equivalent material of construction would be acceptable for the required loading and operating conditions.

In FIG. 2 a perspective view is shown of the first exemplary embodiment of the present invention that is a fixed pivotal retractable roller mechanism 20 showing the roller mechanism 20 in an inoperative state with the housing 22 resting on and statically contacting the support surface 44. The difference between FIG. 1 and FIG. 2 is the fact that FIG. 1 shows the mechanism 20 in an operative state being able to roll along the support surface 44 and FIG. 2 shows the mechanism 20 in an inoperative state wherein item 46 is supported statically upon the support surface 44. The spring 36 is shown compressed due to the additional weight acting towards the support surface 44 from item 46 that is greater than the item 46 weight alone, resulting in compression of spring 36, which in turn causes the frame 26 to move 48 relative to the housing 22, retracting the frame 26 into the housing 22 which results in the housing contact area 54 resting upon and statically contacting the support surface 44, placing the mechanism 20 into the inoperative state. The spring 36 has a specific spring rate constant "K" 42 defined in the units of force per unit distance that allows the spring to extend as shown in FIG. 1 when the mechanism 20 is supporting only the weight of item 46 resulting in the mechanism 20 being in the operative position state. In addition, when the weight of the item 46 is increased such as the situation where item 46 is an article of furniture and a person would be seated in the article of furniture this increasing the weight of item 46 that causes the spring 36 to compress resulting in the mechanism being in the inoperative state. The spring 36 extension corresponds to frame 26 extending, thus resulting in the contact area 54 of the housing 22 separating from the support surface 44 being the situation FIG. 1. Returning to FIG. 2, as the weight of item 46 is increased, spring 36 compresses coinciding with the frame 26 pivotally retracting into the housing 22 allowing the contact area of the housing 52 to rest upon an statically contact the support surface 44. The actual value of the spring rate constant "K" would vary with the weight of item 46 and the contemplated increase in weight of item 46 when it is desired that the mechanism 20 be in the inoperative state or provide static support upon the support surface 44. If item 46 were relatively heavy in weight a higher value of the spring 36 constant "K" 42 would be required and conversely if item 46 were relatively light in weight a lower value of the spring 36 constant "K" 42 would be required. Materials of construction for the spring 36 are to be conventional spring materials that have a high elasticity and can accommodate the required spring constant "K" 42. The preferred construction of the spring 36 is to be a leaf spring, however, an alternate spring construction would be acceptable, such as a coil spring, a wavy spring, a belleville spring, or an equivalent spring construction as long as the required a spring constant "K" 42 was achieved.

The roller contact area 52 that is statically resting upon the support surface 44 remains substantially constant between the mechanism 20 operative state and the inoperative state as the loading that generates the roller contact area 52 is based upon the spring 36 constant "K" 42 which changes very little as the spring is compressed a small amount or distance due to the increased weight of the item 46 in the inoperative state. This is because as item 46 increases its weight even if the weight increase of item 46 is highly significant this additional loading towards the support surface 44 will be carried by the contact area 52 of the housing 22 into the support surface 44 and will not be transmitted into the contact area 52 of the roller 32 as the roller 32 loading against the support surface 44 is determined from the spring 36 force. However, it is important in order not to damage the support surface 44 that either the contact area loading 52 of the roller 32, with the contact area loading being defined in the units of force per unit area not be higher than the contact area 54 loading of the housing 22. Typically the contact area 54 of the housing 22 will be a larger area than the contact area 52 of the roller 32, with the reason for this being that when the mechanism 20 is in the inoperative state and statically contacting the support surface 44 with contact area 54 there is a higher weight loading specifically from the added weight to item 46. When the mechanism 20 is in the operative state and resting upon the roller contact area 52, the only weight is the weight of item 46 which of necessity will be less than in the inoperative state with weight added to item 46. There is a slight added dynamic loading component related to contact area 52 when the mechanism 20 is in the operative state and for this reason it is preferred that the unit loading defined as force per unit area of contact area 52 should be equal to or less than the unit loading for contact area 54. Contact area 52 can be controlled by the size of the roller 32 or wheel through diameter and/or width dimensions, and the materials of construction whose specific deformation characteristics exist on the periphery 34 of the roller 32. Contact area 54 can be controlled by the thickness of the surrounding sidewall 24 and/or the overall size of the housing 22.

Figure 3:
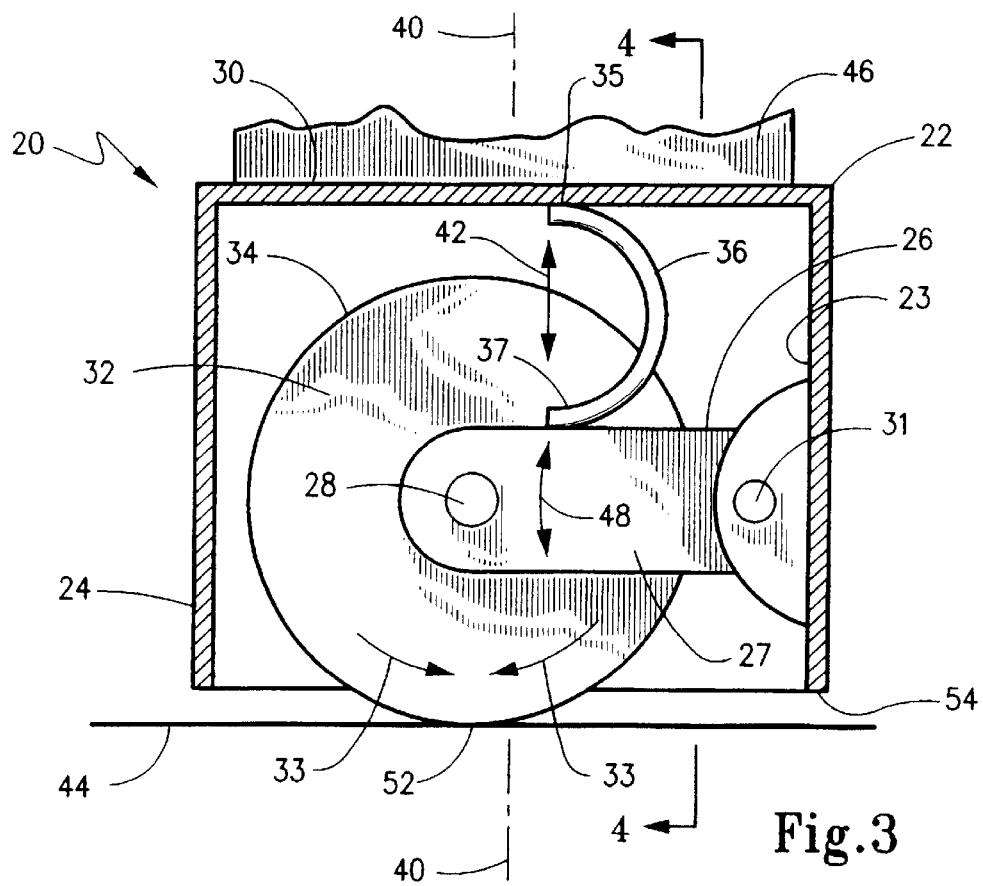
FIG. 3 is a side view cut-away section of the first exemplary embodiment of the pivotal roller mechanism being the fixed pivotal retractable roller mechanism showing the mechanism in an operative state on the support surface.
Figure 4:
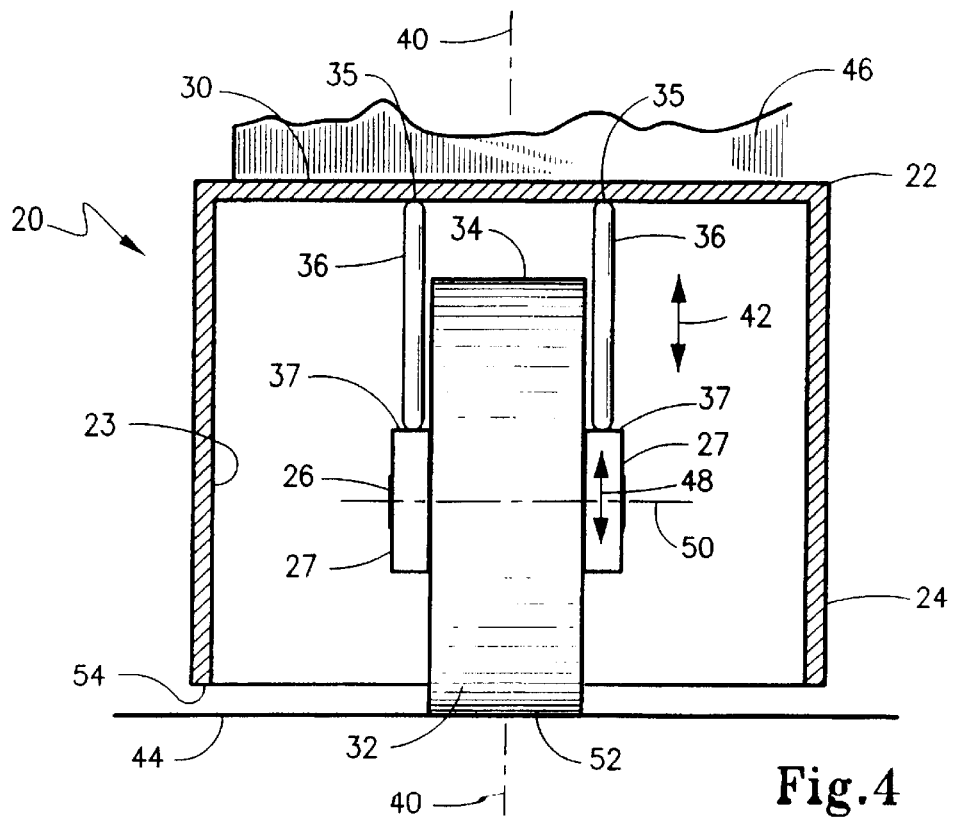
FIG. 4 is an end view cutaway section of the first exemplary embodiment of the pivotal roller mechanism being the fixed pivotal retractable roller mechanism showing the mechanism in an operative state on the support surface.

Next looking to FIGS. 3 and 4, FIG. 3 shows a side view cut-away section of the first exemplary embodiment of the pivotal roller mechanism 20 being the fixed pivotal retractable roller mechanism 20 showing the mechanism 20 in an operative state on the support surface 44 while supporting the item 46. FIG. 4 shows an end view cutaway section of the first exemplary embodiment of the pivotal roller mechanism 20 being the fixed pivotal retractable roller mechanism 20 showing the mechanism 20 in an operative state on the support surface 44. Contact area 52 on the roller periphery 34 of the roller 32 is shown with the roller 32 being rotatably connected around the axle 28 coinciding with the rotational axis 50. Features of the operative state of the mechanism 20 shown in FIGS. 3 and 4 include the housing contact area 54 being separated from the support surface 44 thereby allowing the roller 32 to move along the support surface 44 due to the spring 36 extension causing relative movement between the frame 26 and the housing 22. Looking in detail at the roller 32 it can be seen that the roller 32 is rotatably mounted in the frame 26 with the roller 32 disposed to roll along the support surface 44 when the frame 26 is in the operative position state as shown. This results in the housing 22 or more specifically the surrounding sidewall 24 not being in contact with the support surface allowing the mechanism 20 and the supported item to roll along the support surface 44 with the mechanism 20 being in the operative state. The roller 32 has a rotational axis 50 that is perpendicular to and substantially adjacent to the housing axis 40. The roller 32 also has an outer periphery 34 that comes into contact with the support surface 44, where a contact area 52 is formed against the support surface 44. This contact area 52 would support the weight of the mechanism 20 and the item supported 46, being the situation where the spring 36 extends against the swing arm fixed pivot frame 26 to extend the frame 26, indicated by motion arrows 48, resulting in the operative position state for the frame 26. Preferably, frame 26 can be constructed of a pivoted bifurcated bracket that straddles the roller 32, the bifurcated bracket includes a brace portion 29 (not shown in FIGS. 3 and 4) that terminates into to bifurcated arm portions 27 that straddle the roller 32. The arm portions 27 on a side opposite of the axle 28 terminate in the pivotal 31 engagement or attachment around the pivotal axis 39 (not shown) to the interior portion 23 of the surrounding sidewall 24 of the housing 22. The pivotal axis 39 (not shown) is parallel to the rotational axis 50. The roller 32 could also be constructed as a wheel that rotates about the axle 28 as shown by the directional arrows 33 corresponding to the mechanism 20 moving along the support surface 44 in the operative state. It is important to note the relationship between the rotational axis 50 and the housing axis 40, as these two axes intersect each other in a perpendicular manner. What this results in is that the roller 32 as it rotates about the rotational axis 50 has no castor in relation to the housing 22, this limits the movement of the retractable roller mechanism 20 to being bi-directional along the support surface 44. The feature of not having any castor of the roller 32 in relation to the housing 22 eliminates a requirement for the frame 26 to swivel or pivot about axis 40. Thus, in the first embodiment of the fixed pivotal retractable roller mechanism 20 the movement of the frame 26 within the housing 22 is limited to pivotal movement 48 that acts to define the operative and inoperative position states of frame 26 and hence the mechanism 20.

Figure 5:
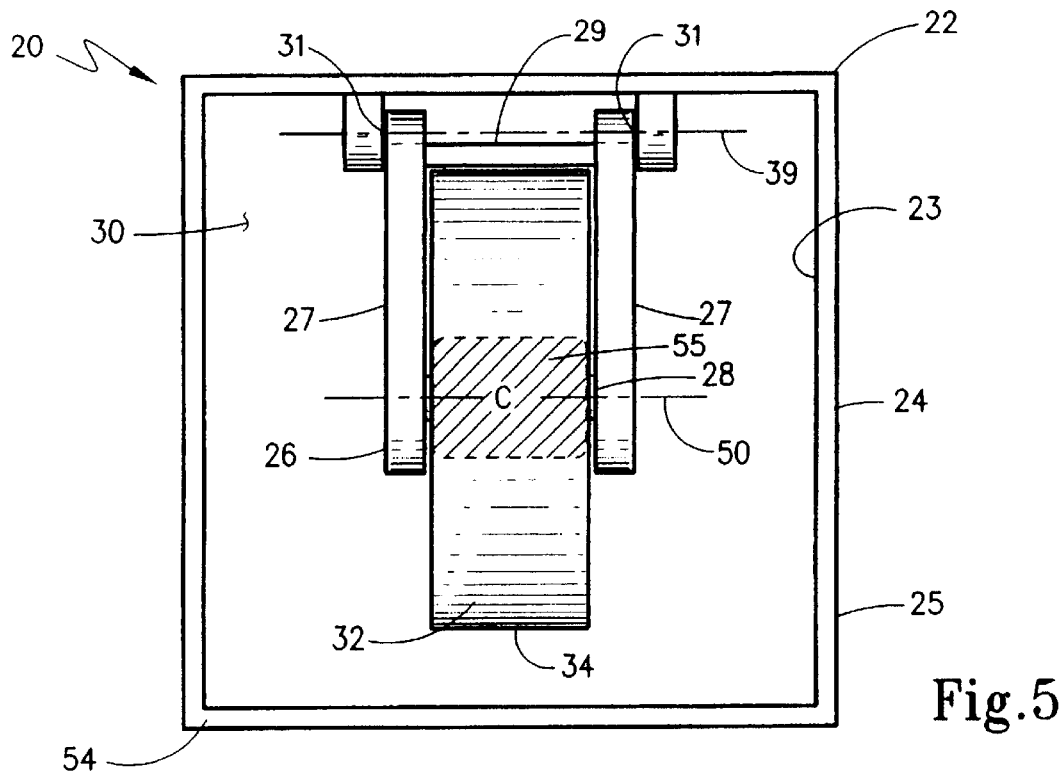
FIG. 5 is a view from the support surface side of the first exemplary embodiment of the pivotal roller mechanism being the fixed pivotal retractable roller mechanism.

The spring elements 36 are disposed between the housing 22 and the frame 26 with the purpose of biasing the frame 26 to the operative position state as shown, thus putting the mechanism 20 into the operative position state. The biasing of the frame 26 acts to extend the frame 26 from the inoperative position state toward the support surface 44. The spring elements 36 have a frame contact attachment 37 on the frame 26 and a base contact attachment 35 on the base 30. The purpose of the spring element 36 frame contact attachment 37 and base contact attachment 35 is to limit the pivotal movement 48 of the frame 26 in the operative position state, thus preventing the roller 32 from excessively extending outside of the housing 22 if the mechanism 20 is lifted a great distance off of the support surface 44. The spring elements 36 can be a singular spring positioned on the frame 26 on one side of the roller 32 or two spring elements 36 can be used with one on each side of the roller 32 as shown. The spring 36 constant "K" 42 is given in force per unit distance and is shown as "K" 42, this delineates the direction of force that the spring 36 exerts between the frame 26 and the base 30 in biasing the frame 26 toward the operative position state as shown in FIGS. 3 and 4. The relative desired value of "K" is as previously described. Further turning to FIG. 5 is a view from the support surface side of the first exemplary embodiment of the pivotal roller mechanism being the fixed pivotal retractable roller mechanism 20 is shown. Contact area 55 delineated as "C" on the roller periphery 34 of the roller 32 is shown with the roller 32 being rotatably connected around the axle 28 being with the roller 32 rotation about the rotational axis 50. The housing in this view is shown by the surrounding sidewall 24 that terminates in the contact area 54, housing contact area 54 has a larger contact area than the roller contact area 55 for the reason that the force loading from the item supported 46 (not shown) in the inoperative state can be multiples of only the item 46 weight alone supported loading in the operative state. For the unit loading, being defined as force per unit area to be equal between the roller contact area 55 and housing contact area 54, or with the roller contact area 55 unit loading less than the housing contact area 54 unit loading. The roller contact area 55 is adjusted by the deformation characteristics of the material of the roller periphery 34 and housing contact area 54 is adjusted by the surrounding sidewall 24 thickness that extends from the base 30 and overall size of the housing 22 which exist between the interior portion 23 of the surrounding sidewall and the exterior portion 25 of the surrounding sidewall. The purpose of this contact area unit loading relationship is to minimize potential damage to the support surface when the mechanism 20 is then either the operative position state or in the inoperative position state.

The pivotal engagement between the housing 22 or more specifically between the interior portion 23 of the surrounding sidewall 24 and the frame 26 is also shown from the support surface side. The frame 26 having pivotal movement that is substantially parallel to the housing axis with the pivotal movement being relative to the housing 22. The frame 26 that includes the brace portion 29 and two bifurcated arm portions 27 are disposed within the housing 22 interior both in the operative state and in the inoperative state. The arm portions 27 on a side opposite of the axle 28 terminate in the pivotal 31 engagement or attachment around the pivotal axis 39 to the interior portion 23 of the surrounding sidewall 24 of the housing 22. The pivotal axis 39 is parallel to the rotational axis 50.

Figure 6:
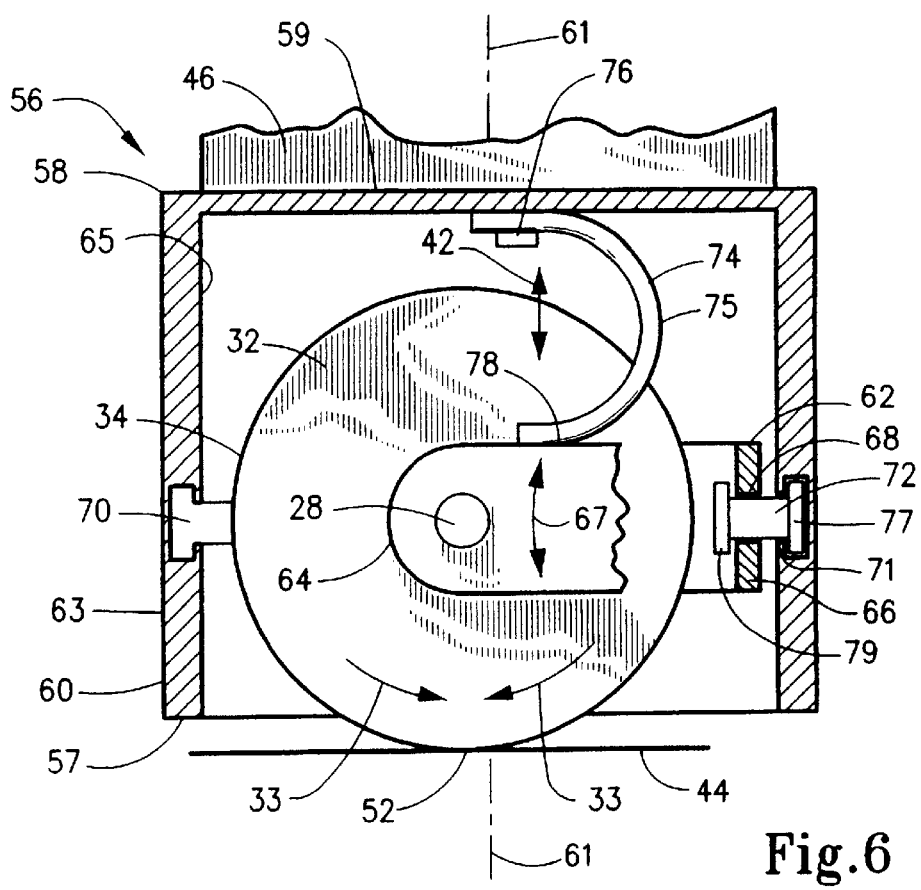
FIG. 6 is a side view cut-away section of the second exemplary embodiment of the pivotal roller mechanism being the pivotal retractable castor roller mechanism in an operative state on the support surface, with the mechanism attached to a furniture leg.
Figure 7:
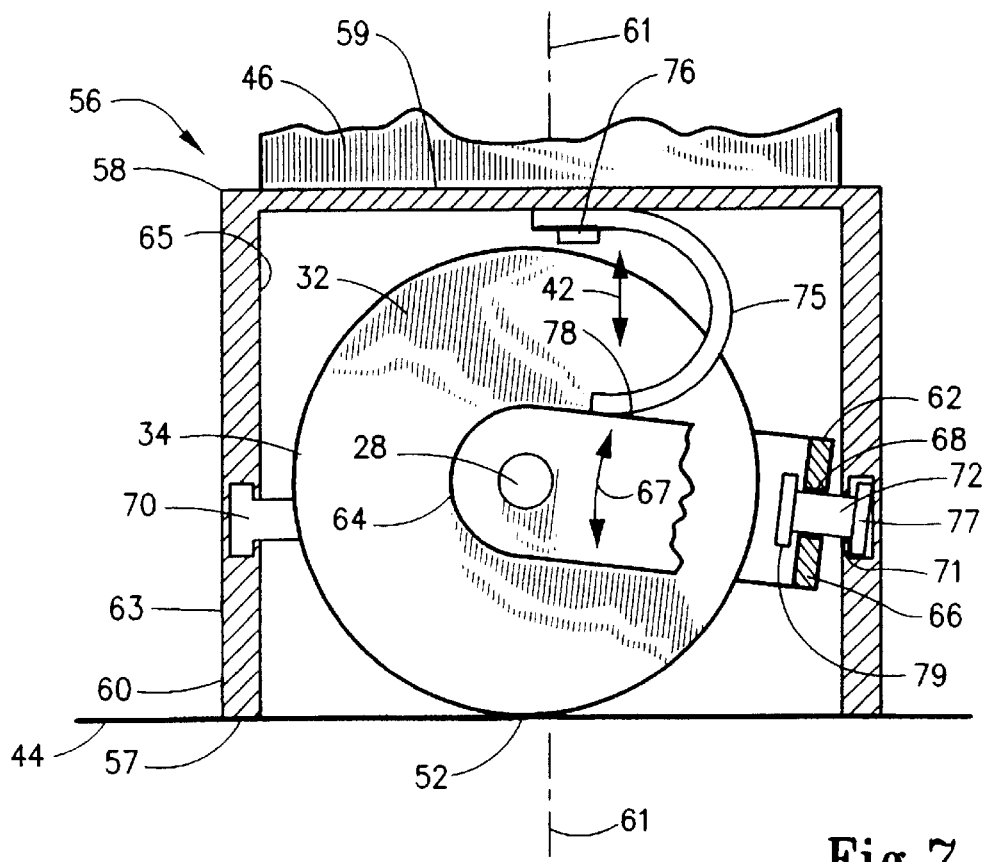
FIG. 7 is a side view cut-away section of the second exemplary embodiment of the pivotal roller mechanism being the pivotal retractable castor roller mechanism in an inoperative state with the roller retracted and a cylindrical sidewall statically contacting and resting on the support surface, with the mechanism attached to a furniture leg.

Further next to FIGS. 6 and 7, wherein FIG. 6 shows a side view cut-away section of the second exemplary embodiment of the pivotal roller mechanism being a pivotal retractable castor roller mechanism 56 in an operative position state on the support surface 44, with the mechanism 56 attached to an item 46 which could be a furniture leg. FIG. 7 is a side view cut-away section of the second exemplary embodiment of the pivotal roller mechanism being the pivotal retractable castor roller mechanism 56 in an inoperative position state with the roller 32 retracted and a cylindrical sidewall 60 statically contacting and resting on the support surface 44, with the mechanism 56 attached to an item 46 which could be a furniture leg. The second exemplary embodiment 56 actually includes a version with a spring element 75 as shown in FIGS. 6 and 7, and a version without a spring element that provides a solid support 74 that acts to replace the spring element, placing the second embodiment 56 in a permanent operative position state, the following describes the spring element version. The second embodiment is a pivotal retractable castor roller mechanism 56 that statically supports an item 46 upon a support surface 44 in an inoperative position state and supports the item 46 to roll along the support surface 44 in an operative position state. Broadly, the second embodiment 56 includes a housing 58 having a centrally located axis 61, the housing 58 having a circular base portion 59 and a surrounding cylindrical sidewall 60 extending from the circular base portion 59 towards the support surface 44 to define a housing interior, with the cylindrical sidewall 60 having an exterior portion 63 and an interior portion 65. Also included is a swingarm castor frame 62 that is slidably engaged to the interior portion 65 of the circular surrounding sidewall 60, the swingarm castor frame 62 is positioned to be substantially perpendicular to the sidewall 60 in the operative state. The slidable engagement is operable to move circumferentially around the interior portion 65 of sidewall 60 to effectuate castor movement action for the mechanism 56. The swingarm castor frame 62 also has pivotal movement 67 being substantially parallel to the centrally located axis 61, the pivotal movement 67 being relative to the housing 58 overall. This pivotal movement 67 allows the swingarm castor frame 62 to have an inoperative position state wherein the swingarm castor frame 62 is retracted such that the housing 58 rests on and statically contacts the support surface 44 as shown in FIG. 7, and an operative position state wherein the swingarm castor frame 62 is extended from the inoperative position state toward the support surface 44 as shown in FIG. 6. In addition, a spring element 75 is included having a first end 76 and a second end 78, with the first end 76 being slidably adjacent to the circular base 59 and the second end 78 being attached to the swingarm castor frame 62. The spring element 75 is positioned to be in-between the centrally located axis 61 and the interior portion 65, with the spring element 75 being operational to bias the swingarm castor frame 62 toward the operative position state shown in FIG. 6. The spring 75 slidably adjacent first end 76 has a coefficient of friction between the spring first end 76 and the circular base portion 59 that is higher than the coefficient of friction for the swingarm castor frame 62 slidable engagement to the interior portion 65 of the sidewall 60 to provide for the dampening of castor movement. Also, a roller element 32 is rotatably mounted in the swingarm castor frame 62, the roller element 32 is disposed to roll along the support surface 44 when the swingarm castor frame 62 is in the operative position state such that the sidewall 60 and hence the housing 58 is not in contact with the support surface 44. The roller element 32 has a rotational axis 50 (Shown in FIG. 8) that is perpendicular to and substantially adjacent to the centrally located axis 61. The circular base portion 59 is adapted to attach to the supported item 46 and is preferably attached by a fastener 38 as shown in FIGS. 1 and 2 for the first embodiment. Alternatively, many other methods of attachment in lieu of the fastener 38 could be used also such as adhesives, interlocking fits, or any other equivalent means of attachment suitable to accommodate the given load conditions. The fastener can be constructed of any suitable steel or plastic adequate for the loading conditions between the item 46 and the mechanism 56. Returning to FIGS. 6 and 7, the materials of construction for the housing 58 are preferably an injected plastic type material for high volume and high quality, alternatively a fabricated material such as metal could be used for lower production volumes, any other equivalent material of construction would be acceptable for the required loading and operating conditions.

The preferred construction of the swingarm castor frame 62 is configured as a castor bifurcated bracket straddling the roller element 32, the castor bifurcated bracket is disposed within the housing 58 interior in the inoperative position state and in the operative position state. The castor bifurcated bracket includes a castor end portion 66 terminating into two castor arm portions 64 that straddle the roller element 32. The materials of construction of the frame 62 are preferably an injected plastic type material for high volume and high quality, alternatively a fabricated material such as metal could be used for lower production volumes, any other equivalent material of construction would be acceptable for the required loading and operating conditions. The preferred structure for the slidable engagement for circumferential castor movement between the frame 62 and the interior portion 65 of the sidewall 60 is by the use of a roller pin 72. The roller pin 72 includes a T-slot head portion 77 that is rotatably engaged with a circumferential T-slot 70 that is located in the interior portion 65 of the sidewall 60. The roller pin 72 also includes an end portion head 79. The roller pin 72 is also rotatably mounted in the frame 62, with the roller pin 72 being operational to provide for the frame 62 being slidably engaged to the interior portion 65 of the sidewall 60 in moving circumferentially for castor movement around the interior portion 65 of the sidewall 60. The roller pin 72 operates by rotating the head portion 77 within the T-slot 70 acting as a retaining guide wherein the roller pin 72 rotates by virtue of the non head portion contacting the T-slot edge 71 and while the roller pin 72 is moving circumferentially around the interior portion 65 causing the roller pin 72 to rotate. The roller pin 72 is also rotatably mounted in the end portion 66 at aperture 68 that allows the roller pin 72 to freely rotate in the end portion 66. The end portion head 79 retains the end portion 66 adjacent to the interior portion 65 of the sidewall 60 both during castor movement and when there is no castor movement.

The difference between FIG. 6 and FIG. 7 is the fact that FIG. 6 shows the mechanism 56 in an operative state being able to roll along the support surface 44 and FIG. 7 shows the mechanism 56 in an inoperative state wherein item 46 is supported statically upon the support surface 44. The spring 75 is shown compressed due to the additional weight acting towards the support surface 44 from item 46 that is greater than the item 46 weight alone, resulting in compression of spring 75, which in turn causes the frame 62 to move 67 relative to the housing 58, retracting the frame 62 into the housing 58 which results in the housing contact area 57 resting upon and statically contacting the support surface 44, placing the mechanism 56 into the inoperative state. The spring 75 has a specific spring rate constant "K" 42 defined in the units of force per unit distance that allows the spring to extend as shown in FIG. 6 when the mechanism 56 is supporting only the weight of item 46 resulting in the mechanism 56 being in the operative position state. In addition, when the weight of the item 46 is increased such as the situation where item 46 is an article of furniture and a person would be seated in the article of furniture thus increasing the weight of item 46 that causes the spring 75 to compress resulting in the mechanism 56 being in the inoperative state. The spring 75 extension corresponds to frame 62 extending, thus resulting in the contact area 57 of the housing 58 separating from the support surface 44 being the situation FIG. 6. Returning to FIG. 7, as the weight of item 46 is increased, spring 75 compresses coinciding with the frame 62 pivotally retracting into the housing 58 allowing the contact area of the housing 57 to rest upon an statically contact the support surface 44. The actual value of the spring rate constant "K" would vary with the weight of item 46 and the contemplated increase in weight of item 46 when it is desired that the mechanism 56 be in the inoperative state or provide static-support upon the support surface 44. If item 46 were relatively heavy in weight, a higher value of the spring 75 constant "K" 42 would be required and conversely if item 46 were relatively light in weight a lower value of the spring 75 constant "K" 42 would be required. Materials of construction for the spring 75 are to be conventional spring materials that have a high elasticity and can accommodate the required spring constant "K" 42. The preferred construction of the spring 75 is to be a leaf spring, however, an alternate spring construction would be acceptable, such as a coil spring, a wavy spring, a belleville spring, or an equivalent spring construction as long as the required a spring constant "K" 42 was achieved.

The roller contact area 52 that is statically resting upon the support surface 44 remains substantially constant between the mechanism 56 operative state and the inoperative state as the loading that generates the roller contact area 52 is based upon the spring 75 constant "K" 42 which changes very little as the spring is compressed a small amount or distance due to the increased weight of the item 46 in the inoperative state. This is because as item 46 increases its weight even if the weight increase of item 46 is highly significant, this additional loading towards the support surface 44 will be carried by the contact area 57 of the housing 58 into the support surface 44 and will not be transmitted into the contact area 52 of the roller 32 as the roller 32 loading against the support surface 44 is determined from the spring 75 force. However, it is important in order not to damage the support surface 44 that either the contact area loading 52 of the roller 32, with the contact area loading being defined in the units of force per unit area not be higher than the contact area 57 loading of the housing 58. Typically the contact area 57 of the housing 58 will be a larger area than the contact area 52 of the roller 32, with the reason for this being that when the mechanism 56 is in the inoperative state and statically contacting the support surface 44 with contact area 57 there is a higher weight loading specifically from the added weight to item 46. When the mechanism 56 is in the operative state and resting upon the roller contact area 52, the only weight is the weight of item 46 which of necessity will be less than in the inoperative state with weight added to item 46. There is a slight added dynamic loading component related to contact area 52 when the mechanism 56 is in the operative state and for this reason it is preferred that the unit loading defined as force per unit area of contact area 52 should be equal to or less than the unit loading for contact area 57. Contact area 52 can be controlled by the size of the roller 32 or wheel through diameter and/or width dimensions, and the materials of construction whose specific deformation characteristics exist on the periphery 34 of the roller 32. Contact area 57 can be controlled by the thickness of the surrounding sidewall 60 and/or the overall diameter of the housing 58. The roller 32 could also be constructed as a wheel that rotates about the axle 28 wherein the axle is disposed between the arm portions 64 with the roller 32 rotatably mounted on the axle 28, movement across the support surface 44 of the mechanism 56 in the operational state is shown by the roller 32 rotational directional arrows 33.

Figure 8:
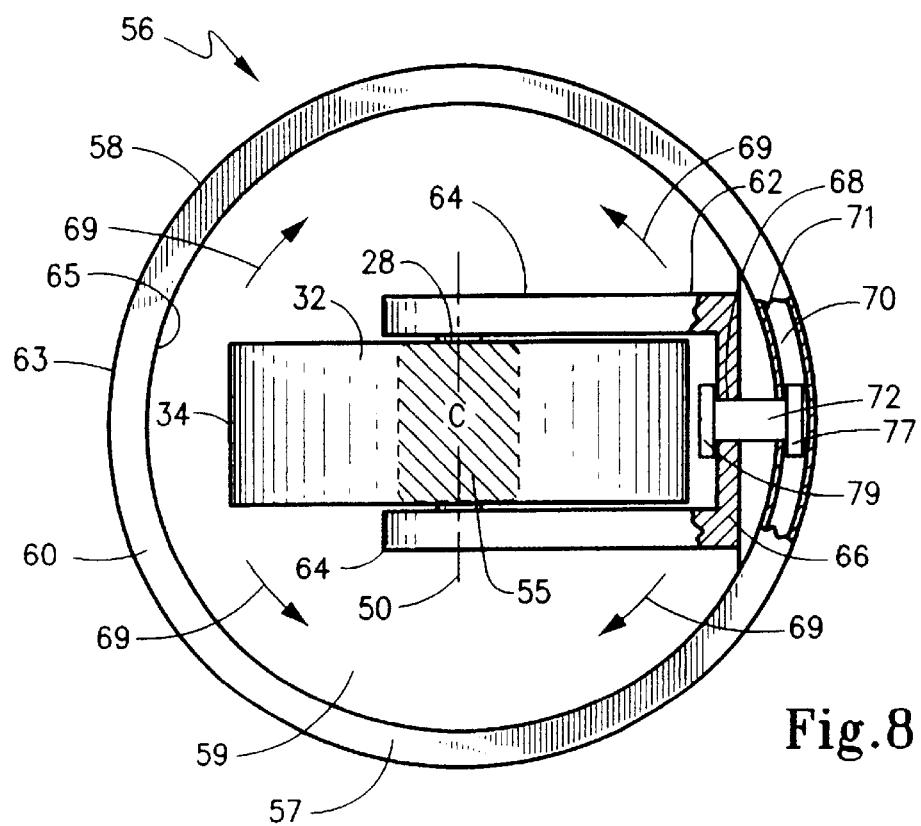
FIG. 8 is a view from the support surface side of the second exemplary embodiment of the pivotal roller mechanism being the pivotal retractable castor roller mechanism.

Finally to FIG. 8 is a view from the support surface side of the second exemplary embodiment of the pivotal roller mechanism being the pivotal retractable castor roller mechanism 56. Contact area 55 delineated as "C" on the roller periphery 34 of the roller 32 is shown with a roller 32 being rotatably connected around the axle 28 being with the roller 32 rotation about the rotational axis 50. The housing in this view is shown by the surrounding sidewall 60 that terminates in the contact area 57, housing contact area 57 has a larger contact area than the roller contact area 55 for the reason that the force loading from the item supported 46 (not shown) in the inoperative state can be multiples of only the item 46 weight alone supported loading in the operative state. For the unit loading, being defined as force per unit area to be equal between the roller contact area 55 and housing contact area 57, or with the roller contact area 55 unit loading less than the housing contact area 57 unit loading. The roller contact area 55 is adjusted by the deformation characteristics of the material of the roller periphery 34 and/or roller 32 diameter and width, with the housing contact area 57 being adjusted by the surrounding sidewall 60 thickness that extends from the base 59 and overall size of the housing 58 which exist between the interior portion 65 of the surrounding sidewall 60 and the exterior portion 63 of the surrounding sidewall 60. The purpose of this contact area unit loading relationship is to minimize potential damage to the support surface when the mechanism 56 is either the operative state or in the inoperative position state.

The preferred construction of the swingarm castor frame 62 is configured as a castor bifurcated bracket straddling the roller element 32, the castor bifurcated bracket is disposed within the housing 58 interior in the inoperative position state and in the operative position state. The castor bifurcated bracket includes a castor end portion 66 terminating into two castor arm portions 64 that straddle the roller element 32. The materials of construction of the frame 62 are preferably an injected plastic type material for high volume and high quality, alternatively a fabricated material such as metal could be used for lower production volumes, any other equivalent material of construction would be acceptable for the required loading and operating conditions. The preferred structure for the slidable engagement for circumferential castor movement between the frame 62 and the interior portion 65 of the sidewall 60 is by the use of a roller pin 72. The roller pin 72 includes a T-slot head portion 77 that is rotatably engaged with a circumferential T-slot 70 that is located in the interior portion 65 of the sidewall 60. The roller pin 72 also includes an end portion head 79. The roller pin 72 is also rotatably mounted in the frame 62, with the roller pin 72 being operational to provide for the frame 62 being slidably engaged to the interior portion 65 of the sidewall 60 in moving circumferentially 69 for castor movement around the interior portion 65 of the sidewall 60. The roller pin 72 operates by rotating the head portion 77 within the T-slot 70 acting as a retaining guide wherein the roller pin 72 rotates by virtue of the non head portion contacting the T-slot edge 71 and while the roller pin 72 is moving circumferentially around the interior portion 65 causing the roller pin 72 to rotate. The roller pin 72 is also rotatably mounted in the end portion 66 at aperture 68 that allows the roller pin 72 to freely rotate in the end portion 66. The end portion head 79 retains the end portion 66 adjacent to the interior portion 65 of the sidewall 60 both during castor movement and when there is no castor movement. The roller pin 72 attachment of the T-slot head portion 77 and end portion head 79 are preferably attached by conventional threads, however, slip or shrink fit or any other method would be acceptable as long as the roller pin 72 would assemble into the T-slot 70 and aperture 68 along with the desired function of a slidable engagement for a castor could be maintained.

Method of Use

Referring to FIGS. 1 and 2 for the first embodiment, a method is given for using the fixed pivotal retractable roller mechanism 20 for statically supporting an item 46 upon the support surface 44 with the mechanism 20 in an inoperative state and supporting the item 46 to roll along the support surface by use of the mechanism 20 in an operative state. Item 46 will typically be adapted toward having two operative position states being desired by the individual in using the item 46, necessitating that the item 46 have its weight increased in a static position or inoperative state. The first state or operative state is where it is desired to have the item 46 be moveable along a support surface 44 to a desired position, where an individual provides the motive force to move the item across the support surface 44, once the desired position is obtained then the individual will quit providing a motive force to item 46, allowing item 46 to be statically positioned at its desired location. The second state or the inoperative state is where an additional weight is placed in the item 46, such as an individual sitting in an article furniture which will cause the roller 32 to retract into the housing 22, with the housing 22 then resting upon and statically contacting the support surface 44.

A first step is to provide the item 46 to be supported, the item 46 can be an article of furniture or any equivalent item that is bulky or unwieldy to move into a desired position, wherein to the weight of item 46 will be increased once item 46 is located in its desired static position. A second step is to provide the fixed pivotal retractable roller mechanism 20 the to support the item 46, the mechanism 20 includes a housing 22, a swingarm fixed pivot frame 26, a roller element 32, with the frame 26 being pivotally engaged with the housing 22, and also includes a spring to bias and extend the frame 26 in relation to the housing 22 to the operative position state. In the operative position state the roller 32 that is rotatably mounted in the frame 26 is in contact 52 with the support surface 44, with the housing 22 being separated from the support surface 44. A third step is to adapt the mechanism 20 to support the item 46, this can be done a number of ways from using fasteners 38, or using an adhesive, or another interlocking type of arrangement such that there is a sufficient attachment between the mechanism 20 and the item 46 to be supported. Moving to the fourth step which requires that the item 46 be putting a force onto the mechanism 20 equal to the item 46 individual weight, which will result in the mechanism 20 being in the operative state which is ready to roll along the support surface 44 while supporting the item 46. At this point the individual provides the motive force to roll the item 46 along the support surface 44 to a desired position without the requirement of lifting the item 46 by the individual or having to make any adjustments to the mechanism 20 itself. Next to the fifth step, which is when the desired position is achieved for item 46, the individual will stop providing the motive force and the item 46 will stop at the desired position. Finally, moving to the sixth step where the item 46 is located in its desired position the weight of the item 46 is then increased which has the effect of overcoming the spring 36 bias causing the frame 26 to relatively retract into the housing 22 which in turn allows the housing 22 to rest on and statically contact the support surface 44. At this point the frame 26 is in the inoperative position state and the mechanism 20 is in the inoperative state, providing static support for the item 46.

Referring to FIGS. 6 and 7 for the second exemplary embodiment, a method is given for using the pivotal retractable castor roller mechanism 56 for statically supporting an item 46 upon the support surface 44 with the mechanism 56 in an inoperative state and supporting the item 46 to roll along the support surface by use of the mechanism 56 in an operative state. Item 46 will typically be adapted toward having two operative position states being desired by the individual in using the item 46, necessitating that the item 46 have its weight increased in a static position. The first state or operative state is where it is desired to have the item 46 be moveable along a support surface 44 to a desired position, where an individual provides the motive force to move the item across the support surface 44, once the desired position is obtained then the individual will quit providing a motive force to item 46, allowing item 46 to be statically positioned at its desired location. The second state or the inoperative state is where an additional weight is placed in the item 46, such as an individual sitting in an article furniture which will cause the roller 32 to retract into the housing 58, with the housing 58 then resting upon and statically contacting the support surface 44.

A first step is to provide the item 46 to be supported, the item 46 can be an article of furniture or any equivalent item that is bulky or unwieldy to move into a desired position, wherein to the weight of item 46 will be increased once item 46 is located in its desired static position. A second step is to provide the fixed pivotal retractable roller mechanism 56 the to support the item 46, the mechanism 56 includes a housing 58, a swingarm fixed pivot frame 62, a roller element 32, with the frame 62 being pivotally engaged with the housing 58, and also includes a spring to bias and extend the frame 62 in relation to the housing 58 to the operative position state. In the operative position state the roller 32 that is rotatably mounted in the frame 62 is in contact 52 with the support surface 44, with the housing 58 being separated from the support surface 44. A third step is to adapt the mechanism 56 to support the item 46, this can be done a number of ways from using fasteners 38, or using an adhesive, or another interlocking type of arrangement such that there is a sufficient attachment between the mechanism 56 and the item 46 to be supported. Moving to the fourth step which requires that the item 46 be putting a force onto the mechanism 56 equal to the item 46 individual weight, which will result in the mechanism 56 being in the operative state which is ready to roll along the support surface 44 while supporting the item 46. At this point the individual provides the motive force to roll the item 46 along the support surface 44 to a desired position without the requirement of lifting the item 46 by the individual or having to make any adjustments to the mechanism 56 itself. Next to the fifth step, which is when the desired position is achieved for item 46, the individual will stop providing the motive force and the item 46 will stop at the desired position. Finally, moving to the sixth step where the item 46 is located in its desired position the weight of the item 46 is then increased which has the effect of overcoming the spring 75 bias causing the frame 62 to relatively retract into the housing 58 which in turn allows the housing 58 to rest on and statically contact the support surface 44. At this point the frame 62 is in the inoperative position state and the mechanism 56 is in the inoperative state, providing static support for the item 46.

Conclusion

Accordingly, the present invention of the fixed pivotal retractable roller mechanism and the pivotal retractable castor roller mechanism have been described with some degree of particularity directed to the exemplary embodiments of the present invention. However, a plurality of retractable roller mechanisms could be used with a wide variety of items to be supported of varying sizes and weights, while still accomplishing the desired states of statically supporting the item in an inoperative state and allowing the item to be moved along the support surface in an operative state. It should be appreciated, though, that the present invention is defined by the following claims construed in light of the prior art so that modifications or changes may be made to the exemplary embodiments of the present invention without departing from the inventive concepts contained herein.

What is claimed is:

1. A fixed pivotal retractable roller mechanism that statically supports an item upon a support surface in an inoperative state and supports the item to roll along the support surface in an operative state, comprising:

(a) a housing having a symmetrically located axis;

(b) a swingarm fixed pivot frame that is pivotally engaged with said housing, said swingarm fixed pivot frame having a pivotal movement that is relative to said housing, said swingarm fixed pivot frame having an inoperative position state wherein said swingarm fixed pivot frame is pivoted to allow said housing to rest on and statically contact the support surface and an operative position state wherein said swingarm fixed pivot frame is pivoted from the inoperative position state to allow said housing to separate from the support surface;

(c) a spring element disposed between said housing and said swingarm fixed pivot frame to bias said swingarm fixed pivot frame toward the operative position state; and (d) a non castor wheel rotatably mounted in said swingarm fixed pivot frame, said roller element disposed to only roll bidirectionally along the support surface when said swingarm fixed pivot frame is in the operative position state such that said housing is not in contact with the support surface, said wheel having a rotational axis perpendicular to and intersecting the housing axis.

2. A fixed pivotal retractable roller mechanism according to claim 1 wherein said housing is adapted to attach to the item.

3. A fixed pivotal retractable roller mechanism according to claim 1 wherein said spring element has a spring strength constant "K" as measured in force per unit distance such that said swingarm fixed pivot frame is in the operative position state when said pivotal retractable roller mechanism is supporting the items weight and said swingarm fixed pivot frame is in the inoperative position state when said pivotal retractable roller mechanism is supporting a weight greater than the items weight.

4. A fixed pivotal retractable roller mechanism according to claim 1 further including a contact attachment disposed between said spring element and said housing, and said spring element and said swingarm fixed pivot frame, said contact attachments are functional to limit said swingarm fixed pivot frame pivotal movement in the operative position state.

5. A fixed pivotal retractable roller mechanism that statically supports an item upon a support surface in an inoperative state and supports the item to roll along the support surface in an operative state, comprising:

(a) a housing having a symmetrically located axis, said housing including a base portion and a surrounding sidewall extending from said base portion towards the support surface to define a housing interior, said surrounding sidewall having an exterior portion and an interior portion;

(b) a swingarm fixed pivot frame that is pivotally engaged with said interior portion of said surrounding sidewall, said swingarm fixed pivot frame having a pivotal movement that is relative to said housing, said swingarm fixed pivot frame having an inoperative position state wherein said swingarm fixed pivot frame is pivoted to allow said surrounding sidewall to rest on and statically contact the support surface and an operative position state wherein said swingarm fixed pivot frame is pivoted from the inoperative position state to allow said surrounding sidewall to separate from the support surface;

(c) a spring element disposed within said housing interior positioned between said base and said swingarm fixed pivot frame to bias said swingarm fixed pivot frame toward the operative position state; and (d) a non castor wheel rotatably mounted in said swingarm fixed pivot frame, said wheel disposed to only roll bidirectionally along the support surface when said swingarm fixed pivot frame is in the operative position state such that said surrounding sidewall is not in contact with the support surface, said wheel having a rotational axis perpendicular to and intersecting the housing axis.

6. A fixed pivotal retractable roller mechanism according to claim 5 wherein said swingarm fixed pivot frame is constructed of a pivoted bifurcated bracket straddling said wheel, said pivoted bifurcated bracket is disposed within said housing interior in the inoperative position state and in the operative position state.

7. A fixed pivotal retractable roller mechanism according to claim 6 wherein said pivoted bifurcated bracket includes a brace portion terminating into two arm portions that straddle said roller element.

8. A fixed pivotal retractable roller mechanism according to claim 7 further including an axle disposed between said arm portions wherein said wheel is rotatably mounted on said axle.

9. A fixed pivotal retractable roller mechanism according to claim 8 wherein said arm portions on a side opposite said axle terminate in a pivotal attachment to said surrounding sidewall around a pivotal axis that is parallel to the rotational axis.

10. A fixed pivotal retractable roller mechanism according to claim 5 wherein said base is adapted to be attached to the item.

11. A fixed pivotal retractable roller mechanism according to claim 10 wherein said attachment includes a fastener.

12. A fixed pivotal retractable roller mechanism according to claim 5 wherein said spring element has a spring strength constant "K" as measured in force per unit distance such that said swingarm fixed pivot frame is in the operative position state when said pivotal retractable roller mechanism is supporting the items weight and said swingarm fixed pivot frame is in the inoperative position state when said pivotal retractable roller mechanism is supporting a weight greater than the items weight.

13. A fixed pivotal retractable roller mechanism according to claim 5 further including a contact attachment disposed between said spring element and said base, and said spring element and said swingarm fixed pivot frame, said contact attachments are functional to limit said swingarm fixed pivot frame pivotal movement in the operative position state.

14. A pivotal castor roller mechanism that supports an item to roll along a support surface in an operative position state, comprising:
  (a) a housing having a centrally located axis, said housing including a circular base portion and a surrounding cylindrical sidewall extending from said circular base portion towards the support surface to define a housing interior, said cylindrical sidewall having an exterior portion and an interior portion;
  (b) a swingarm castor frame slidably engaged to said interior portion of said sidewall, said swingarm castor frame positioned to be substantially perpendicular to said sidewall, said slidable engagement is operable to move circumferentially around said interior portion of sidewall;
  (c) a support element having a first end and a second end, said first end is slidably adjacent to said circular base and said second end is attached to said swingarm castor frame, said support element positioned to be in-between the centrally located axis and said interior portion, said support element is operational to restrict movement of said swingarm castor frame parallel to the centrally located axis, placing said mechanism in a permanent operative position state with said sidewall not in contact with the support surface, said support element slidably adjacent first end having a coefficient of friction higher than said swingarm castor frame slidable engagement to said interior portion of sidewall to provide for dampening of castor movement; and
  (d) a roller element rotatably mounted in said swingarm castor frame positioned to roll along the support surface, said roller element having a rotational axis perpendicular to and substantially adjacent to the centrally located axis.

15. A pivotal castor roller mechanism according to claim 14 wherein said circular base portion is adapted to attach to the item.

16. A pivotal castor roller mechanism according to claim 15 wherein said attachment includes a fastener.

17. A pivotal castor roller mechanism according to claim 14 further including a roller pin with a head that is rotatably engaged with a circumferential T-slot located in said interior portion of said cylindrical sidewall, said roller pin is also rotatably mounted in said swingarm castor frame that is retained by an end portion head on said roller pin that retains said swingarm castor frame slidably adjacent to said interior portion of said sidewall both during castor movement and when there is no castor movement, said roller pin is operational to provide for said swingarm castor frame being slidably engaged to said interior portion of said sidewall in moving circumferentially around said interior portion of sidewall.

18. A pivotal retractable castor roller mechanism that statically supports an item upon a support surface in an inoperative state and supports the item to roll along the support surface in an operative state, comprising:
  (a) a housing having a centrally located axis, said housing including a circular base portion and a surrounding cylindrical sidewall extending from said circular base portion towards the support surface to define a housing interior, said cylindrical sidewall having an exterior portion and an interior portion;
  (b) a swingarm castor frame slidably engaged to said interior portion of said sidewall, said swingarm castor frame positioned to be substantially perpendicular to said sidewall in the operative state, said slidable engagement is operable to move circumferentially around said interior portion of sidewall, said swingarm castor frame having a pivotal movement is relative to said housing, said swingarm castor frame having an inoperative position state wherein said swingarm castor frame is pivoted to allow said surrounding cylindrical sidewall to rest on and statically contact the support surface and an operative position state wherein said swingarm castor frame is pivoted from the inoperative position state to allow said housing to separate from the support surface;
  (c) a spring element having a first end and a second end, said first end is slidably adjacent to said circular base and said second end is attached to said swingarm castor frame, said spring element positioned to be in-between the centrally located axis and said interior portion, said spring element is operational to bias said swingarm castor frame toward the operative position state, said spring slidably adjacent first end having a coefficient of friction higher than said swingarm castor frame slidable engagement to said interior portion of sidewall to provide for dampening of castor movement; and
  (d) a roller element rotatably mounted in said swingarm castor frame, said roller element disposed to roll along the support surface when said swingarm castor frame is in the operative position state such that said housing is not in contact with the support surface, said roller element having a rotational axis perpendicular to and substantially adjacent to the centrally located axis.

19. A pivotal retractable castor roller mechanism according to claim 18 wherein said circular base portion is adapted to attach to the item.

20. A pivotal retractable castor roller mechanism according to claim 19 wherein said attachment includes a fastener.

21. A pivotal castor roller mechanism according to claim 18 further including a roller pin with a head that is rotatably engaged with a circumferential T-slot located in said interior portion of said cylindrical sidewall, said roller pin is also rotatably mounted in said swingarm castor frame that is retained by an end portion head on said roller pin that retains said swingarm castor frame slidably adjacent to said interior portion of said sidewall both during castor movement and when there is no castor movement, said roller pin is operational to provide for said swingarm castor frame being slidably engaged to said interior portion of said sidewall in moving circumferentially around said interior portion of sidewall.

22. A pivotal retractable castor roller mechanism according to claim 21 wherein said swingarm castor frame is constructed of a castor bifurcated bracket straddling said roller element, said castor bifurcated bracket is disposed within said housing interior in the inoperative position state and in the operative position state.

23. A pivotal retractable castor roller mechanism according to claim 22 wherein said castor bifurcated bracket includes a castor end portion terminating into two castor arm portions that straddle said roller element, said castor end portion rotatably mounts said roller pin.

24. A pivotal retractable castor roller mechanism according to claim 23 wherein said roller element is constructed of a wheel.

25. A pivotal retractable castor roller mechanism according to claim 24 further including an axle disposed between said arm portions wherein said wheel is rotatably mounted on said axle.

26. A pivotal retractable castor roller mechanism according to claim 18 wherein said spring element has a spring strength constant "K" as measured in force per unit distance such that said swingarm castor frame is in the operative position state when said pivotal retractable castor roller mechanism is supporting the items weight and said swingarm castor frame is in the inoperative position state when said castor roller mechanism is supporting a weight greater than the items weight.

27. A pivotal retractable castor roller mechanism according to claim 18 wherein said roller element is constructed of a deformable material on its outer periphery.

28. A pivotal retractable castor roller mechanism according to claim 27 wherein when said pivotal retractable castor roller mechanism is in the operative position state said roller element outer periphery deforms to form a contact area on the support surface resulting in a given unit loading in force per unit area that is equal to or less than a given unit loading in force per unit area from a contact area formed on the support surface by said surrounding cylindrical sidewall while said pivotal retractable castor roller mechanism is in the inoperative position state.

29. A pivotal retractable castor roller mechanism according to claim 18 wherein said spring element is constructed of a leaf spring.

30. A method of statically supporting an item upon a support surface by use of a fixed pivotal retractable roller mechanism in an inoperative state and supporting the item to roll along the support surface by use of said fixed pivotal retractable roller mechanism in an operative state, comprising the steps of:

(a) providing the item to be supported;

(b) providing said fixed pivotal retractable roller mechanism that can support the item, said fixed pivotal retractable roller mechanism includes a housing, a swingarm frame that is pivotally engaged with said housing, a spring element to bias and extend said swingarm frame in relation to said housing to an operative position state, and a non castor wheel rotatably mounted in said swingarm frame;

(c) adapting said pivotal retractable roller mechanism to support the item;

(d) rolling the item only bidirectionally along the support surface to a desired position, with said swingarm frame in the operative position state corresponding to the operative state for said fixed pivotal retractable roller mechanism;

(e) stopping the rolling of the item at the desired position; and (f) increasing the weight of the item to overcome the spring element bias to retract said swingarm frame in relation to said housing allowing said housing to rest on and statically contact the support surface to put said swingarm frame in an inoperative position state corresponding to the inoperative state for said fixed pivotal retractable roller mechanism.

* * * * *